United States Patent
Elliott et al.

(10) Patent No.: US 10,399,637 B2
(45) Date of Patent: Sep. 3, 2019

(54) SINGLE MOTOR POWER UNIT AND PROCEDURE FOR MOUNTING THE UNIT ONTO BICYCLE FRAME

(71) Applicant: S.C.P. TYPHOON, Monaco (MC)

(72) Inventors: William Bond Elliott, Panama City (PA); Istvan Varjas, Pécs (HU)

(73) Assignee: S.C.P. TYPHOON, Monaco (MC)

( * ) Notice: Subject to any disclaimer, the term of this patent is extended or adjusted under 35 U.S.C. 154(b) by 0 days.

(21) Appl. No.: 15/550,034

(22) PCT Filed: Feb. 11, 2015

(86) PCT No.: PCT/IB2015/051024
§ 371 (c)(1),
(2) Date: Aug. 10, 2017

(87) PCT Pub. No.: WO2016/128792
PCT Pub. Date: Aug. 18, 2016

(65) Prior Publication Data
US 2018/0029667 A1 Feb. 1, 2018

(51) Int. Cl.
*B62M 6/55* (2010.01)
*F16H 37/06* (2006.01)
(Continued)

(52) U.S. Cl.
CPC ............... *B62M 6/55* (2013.01); *B62K 19/30* (2013.01); *B62M 11/145* (2013.01); *F16D 7/10* (2013.01); *F16D 43/208* (2013.01)

(58) Field of Classification Search
CPC ........ B62M 11/145; B62M 6/55; B62K 19/30
See application file for complete search history.

(56) References Cited

U.S. PATENT DOCUMENTS 4,555,963 A * 12/1985 Nelson .................... F16H 13/06
    475/195
6,108,886 A * 8/2000 Kimes ..................... A61F 2/958
    29/280

(Continued)

FOREIGN PATENT DOCUMENTS

DE    1575735 A1    1/1970
EP    1193171 B1    7/2008
(Continued)

OTHER PUBLICATIONS

Search Report of Chinese Patent Application No. 201580075893.9 dated Feb. 22, 2019.

*Primary Examiner* — Tony H Winner
(74) *Attorney, Agent, or Firm* — Idea Intellectual Limited; Margaret A. Burke; Sam T. Yip (57) ABSTRACT

The invention is a single motor power unit, suitably for being mounted onto a bicycle frame, which is fitted with a motor (7), related power supply (13), bearings (8), crank shaft pinion gearhead (11), propulsor pinion gearhead (10), planetary gearbox (15), and central processor unit (12). It is characterized in that the propulsor pinion gearhead (10) is connected to a pinion with dynamometric system (19), having an at least approximately identical axis, and to a planetary gearbox (15) therethrough, while the inside of the bearing (8) is in fixed connection with the crank shaft (9) and the outside of the bearing (8) is in fixed connection with the crank shaft pinion gearhead (11). The invention is also the procedure for placing the power unit according to claim suitably into a bicycle frame.

4 Claims, 5 Drawing Sheets

(51) Int. Cl.
 *B62M 11/14* (2006.01)
 *B62K 19/30* (2006.01)
 *F16D 43/208* (2006.01)
 *F16D 7/10* (2006.01)

(56) References Cited

U.S. PATENT DOCUMENTS

| | | | | |
|---|---|---|---|---|
| 6,230,586 B1 * | 5/2001 | Chang | ............... | B62M 6/55 180/206.4 |
| 6,554,730 B1 * | 4/2003 | Sakai | ............... | B62M 6/55 180/206.4 |
| 9,227,695 B2 * | 1/2016 | Liu | ............... | B62M 6/45 |
| 9,616,969 B2 * | 4/2017 | MacMartin | ............... | B62M 6/55 |
| 2011/0001442 A1 * | 1/2011 | Lee | ............... | B62M 6/45 318/139 |
| 2011/0042156 A1 * | 2/2011 | Vincenz | ............... | B62H 5/001 180/206.5 |
| 2013/0093187 A1 * | 4/2013 | Lim | ............... | H02K 13/00 290/50 |
| 2013/0184112 A1 * | 7/2013 | Choi | ............... | F16H 37/065 475/5 |
| 2017/0183057 A1 * | 6/2017 | Gibbings | ............... | B62M 3/003 |
| 2018/0244342 A1 | 8/2018 | MacMartin | | |

FOREIGN PATENT DOCUMENTS

| | | |
|---|---|---|
| EP | 1878650 B1 | 12/2008 |
| EP | 2228293 A2 | 9/2010 |
| EP | 2502819 A1 | 9/2012 |
| JP | 5-238461 A | 9/1993 |
| WO | 2005009831 A2 | 2/2005 |
| WO | 2011021164 A2 | 2/2011 |
| WO | 2011146851 A1 | 11/2011 |
| WO | 2013067565 A1 | 5/2013 |

* cited by examiner

SINGLE MOTOR POWER UNIT AND PROCEDURE FOR MOUNTING THE UNIT ONTO BICYCLE FRAME

CROSS-REFERENCE TO RELATED APPLICATION

This application is a national phase entry of PCT application PCT/IB2015/051024 filed on Feb. 11, 2015; the disclosure of which is incorporated herein by reference in its entirety.

FIELD OF THE INVENTION

The subject of the invention is a single motor power unit, suitably for being mounted onto a bicycle frame, which is fitted with a motor, power supply, bearings, crank shaft pinion gearhead, propulsor pinion gearhead, planetary gearbox, and a central processor unit, where the crank shaft pinion gearhead is connected to a crank shaft through bearings, and the central processor unit is in wired or wireless connection with the motor. The subject of the invention also includes the procedure for mounting the unit suitably onto a bicycle frame.

BACKGROUND OF THE INVENTION

The state of the art includes the following known solutions.

European publication document No. EP2502819 A1 and European patent document No. EP 1878650 B1 describes a product called Vivax Assist. The auxiliary engine is not visible and is mounted in a top-down direction by the seat. The engine is mounted into the seat tube in a top-down direction and is fit for being installed in various frames. Similarly to the present invention, the engine supports treadling after pressing a button on the handlebar. The performance of the approximately 1.8 kg heavy device is 200 Watt. The disadvantages of the engine include that the engine keeps the pedals running in case of, for example, an accident, and that the engine might even break the axis if it cannot keep turning due to stuck pedals. Another disadvantage is that the pinion is always rotated, when the engine is not running, thereby being subject to amortization and providing resistance.

Other known solutions include auxiliary motors mounted into the lower, tilted frame tube. Not all existing frames are fit for being used with such solutions, and the bicycles are also heavier than optimal. A significant disadvantage is that such electric bicycles can be purchased and used only as pre-fitted units and they are unfit for being mounted individually and using unique settings.

European patent document No. EP 1193171 B1 and international patent documents No. WO2005009831 A2 and WO2011146851 A1 describe electric bicycles with auxiliary engine. European patent document No. EP2228293 A2 describes an engine for easy bicycles that drives the axis of the bicycle.

International publication document No. WO2011021164 A2 describes devices for electric bicycles. The emphasis is placed by this invention onto the technical details of the wheel.

International publication document No. WO2013067565 A1 describes a more traditional Pedelec electric bicycle, which is heavier and is fitted with an external auxiliary engine.

A common disadvantage of solutions belonging to the state of art is that they are significantly heavier than 15 to 20 kg, so they are not suitable for sport activities or heavy usage. Another disadvantage is that the user needs to keep the device switched on when riding uphill. Yet another disadvantage is that the design of such devices may cause the back wheel spin freely on wet road, thereby possibly putting the user in danger.

SUMMARY OF THE INVENTION

The purpose of the invention is to eliminate the shortfalls of known solutions and to implement a device fitted with a single motor (mono-engine) that can help riding a bicycle without being detected by outsiders and can do so in a safe manner by using a pinion with dynamometric system to prevent the axis from breaking and a freely rotating bearing to protect the motor and to prevent the propulsor pinion gearhead from wear. Another purpose of the invention is to implement an engine that cannot be seen from the outside after installation and the size and design of which allows the engine to be placed into the frame of the bicycle through the mounting hole of the bottom bracket.

The inventive step is based on the recognition that it is advantageous to insert an engine of small weight, that cannot be seen from the outside, into the bicycle frame, so that the pinion with dynamometric system is also installed and the bearing can rotate freely on the axis. This recognition allows the engine to quietly increase performance when necessary in certain situations, without almost any change to the weight of the bicycle, and the engine itself is also protected, as the installed pinion with dynamometric system provides the axis against breaking and the freely rotating bearing protects the motor and the propulsor pinion gearhead from wear.

According to the set purpose, the most general implementation form of the solution according to the invention can be implemented according to claim 1. The various implementation forms are described in the sub-claims.

In general, the solution is a single motor engine to be placed advantageously into a bicycle frame, which is fitted with a motor, a related power source, bearings, crank shaft pinion gearhead, propulsor pinion gearhead, planetary gearbox, and a central processor unit, and the crank shaft pinion gearhead is connected to the crank shaft through the bearing, and the central processor unit is in wired or wireless connection with the motor through a switch.

A characteristic feature of the invention is that the propulsor pinion gearhead is connected to a pinion with dynamometric system, having an at least approximately identical axis, and to a planetary gearbox through the pinion, while the inside of the bearing is in fixed connection with the crank shaft and the outside of the bearing is in fixed connection with the pinion gearhead of the crank shaft.

Another implementation example is where it is placed into the seat tube. Another implementation example is where it is placed into the frame tube.

Another characteristic feature may be that the pinion with dynamometric system has a spring, ball bearing, and round canal, and the pinion with dynamometric system is connected to the propulsor pinion gearhead through the balls bearing located in the round canal.

Another characteristic feature may be that the power source is placed into the bicycle frame or onto the outside of the bicycle.

In the course of the procedure for placing the invention in general, advantageously into the bicycle frame, the single motor power unit in placed into the seat tube or the frame tube, and placement is carried out through the mounting hole of the bottom bracket by the end of the frame tube or seat tube.

BRIEF DESCRIPTION OF THE DRAWINGS

The invention is presented in more detail using implementation examples, drawings below. On the attached drawings.

DETAILED DESCRIPTION

Figure 1:
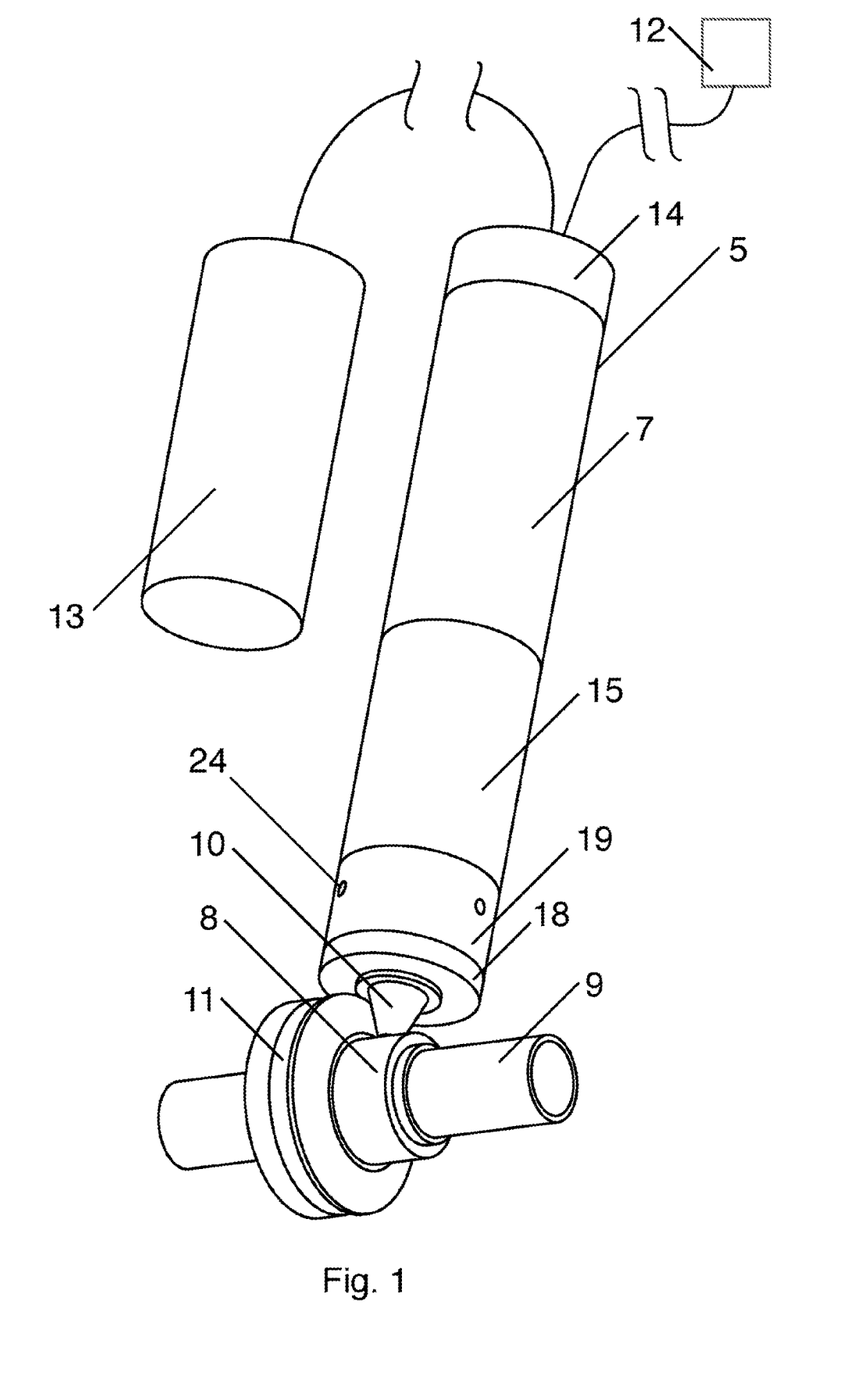
FIG. 1 shows an axonometric drawing of the single motor power unit.

FIG. 1 shows a spatial view of the single motor power unit 5 with the connected power supply 13. The single motor power unit 5 has a motor 7 and a corresponding power supply 13. The power supply 13 may be, among others, a battery that produces power required for running the motor 7. The power supply 13 is connected to the motor 7 but may be placed almost anywhere. The motor controller 14 is also connected to the motor 7, which is controlled by the central processor unit 12. The central processor unit 12 is in wired or wireless connection with the single motor power unit 5. The central processor unit 12 can be anything that can start up the motor 7, such as a button, a heart rate meter, rotation meter, or speed meter. Even a smart phone application could be used to this end. In case of receiving a given impulse—too high heart rate, upcoming hill, button pressed by the user—, the central processor unit 12 starts up the motor 7 through the motor controller 14, which will support the driving of the crank shaft 9. The motor 7 does not need to work continuously, it provides help only in certain necessary sections. These may include exhaustion, uphill, or other situations. The invention is fitted with three pinions. There is a cogwheel connection between the crank shaft pinion gearhead 11 and the propulsor pinion gearhead 10. The crank shaft pinion gearhead 11 is connected to the crank shaft 9 through bearings 8. The internal part of the bearings 8 is in fix connection with the crank shaft 9 and the outside part is in fix connection with the crank shaft pinion gearhead 11. The crank shaft pinion gearhead 11 is driven by the propulsor pinion gearhead 10 through the motor 7 and the planetary gearbox 15. One of the novelties of the device, i.e. the pinion with dynamometric system 19 is located between the planetary gearbox 15 and the propulsor pinion gearhead 10. The crank shaft of the pinion with dynamometric system 19 and of the propulsor pinion gearhead 10 is the same and is secured by fixing bearings 18. An essential feature of the device is that the motor 7 and the propulsor pinion gearhead 10 is not connected to the crank shaft 9 when the user is simply working the pedals, so they are not subject to wear and tear. This is due to the installation of the bearings 8, which prevent the emergence of any resistance. This provides protection against early damages and wear and tear. When the single motor power unit 5 is operating, the motor 7 drives the propulsor pinion gearhead 10 through the pinion with dynamometric system 19, which is connected to and driving the crank shaft pinion gearhead 11. Thus, the motor 7 and the entire single motor power unit 5 helps driving the crank shaft 9 and supplements human power. The pinion with dynamometric system 19 ensures that the single motor power unit 5 will not break when the motor 7 would drive the crank shaft 9 but the movement of the crank shaft 9 is prevented. The prevention of the crank shaft 9 due to an accident or the interruption of driving by human force results in great and unexpected momentum on the device, which may cause damage and injury. The flexibility of the pinion with dynamometric system 19 may be set through the mounting holes 24.

Figure 2:
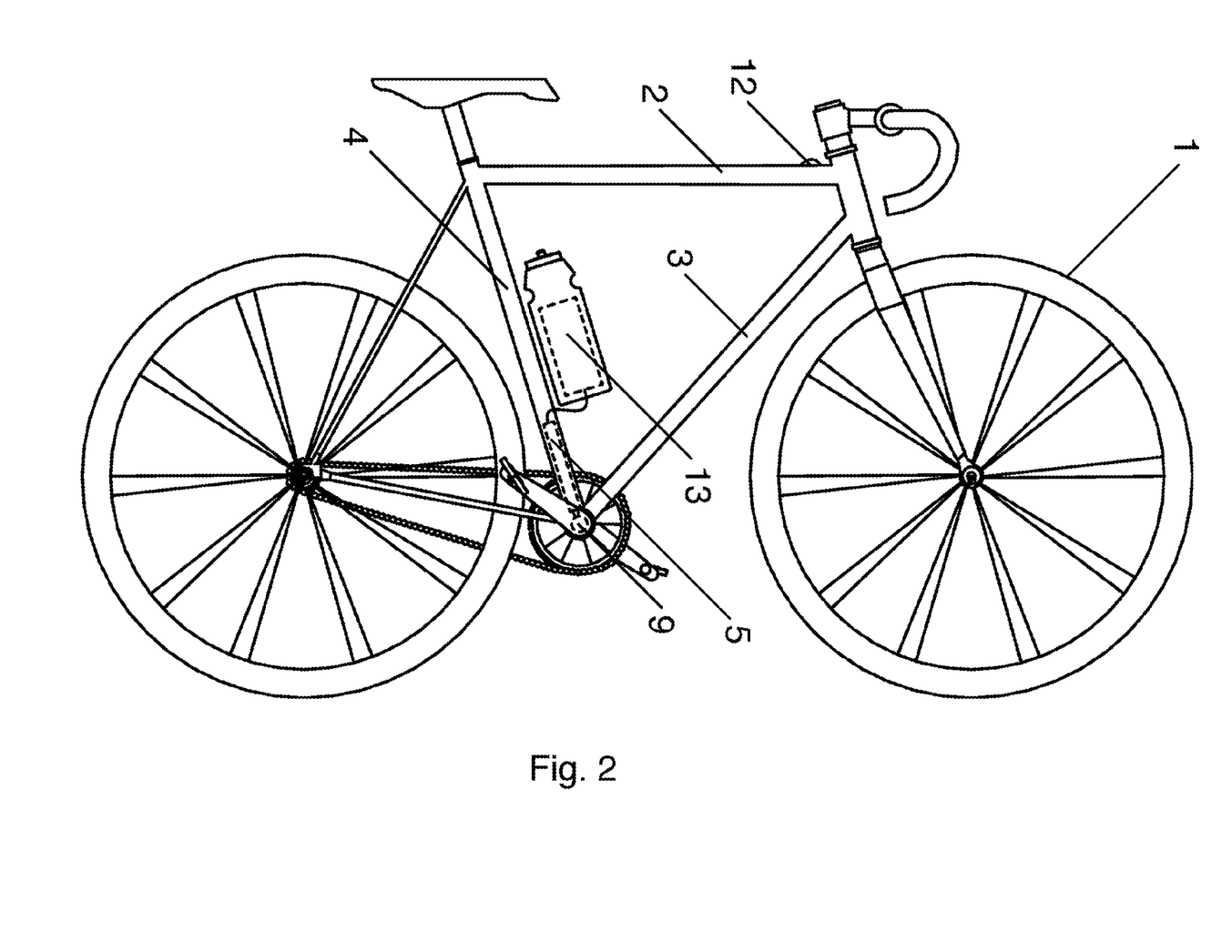
FIG. 2 shows a side-view of the bicycle and presents the location of the invention.

FIG. 2 shows the side-view of an average bicycle 1 fitted with a single motor power unit 5 so that it cannot be seen from the outside. Thus, the use of the device may be kept quiet, if needed. The main components of the frame 2 of the bicycle 1 are the tilted frame tube 3 and the approximately vertical seat tube 4. The single motor power unit 5 is placed into the latter seat tube 4 from below, from the direction of the crank shaft 9. The single motor power unit 5 may be also placed into the tilted frame tube 3, also from below. The power supply 13 that generates power is mounted onto the seat tube 4 in an unassuming manner, hidden in the flask. Of course, the power supply 13 can be mounted onto other parts of the bicycle 1, in the frame 2, or even onto the user. The figure also shows the central processor unit 12, which, in this case, is a simple button. The central processor unit 12 is in wired or wireless connection with the single motor power unit 5 and indicates the commencement and end of operation. In addition to a button, the central processor unit 12 of the single motor power unit 5 may also be composed of a mileage meter, mobile phone, rotation meter, or heart rate meter.

Figure 3:
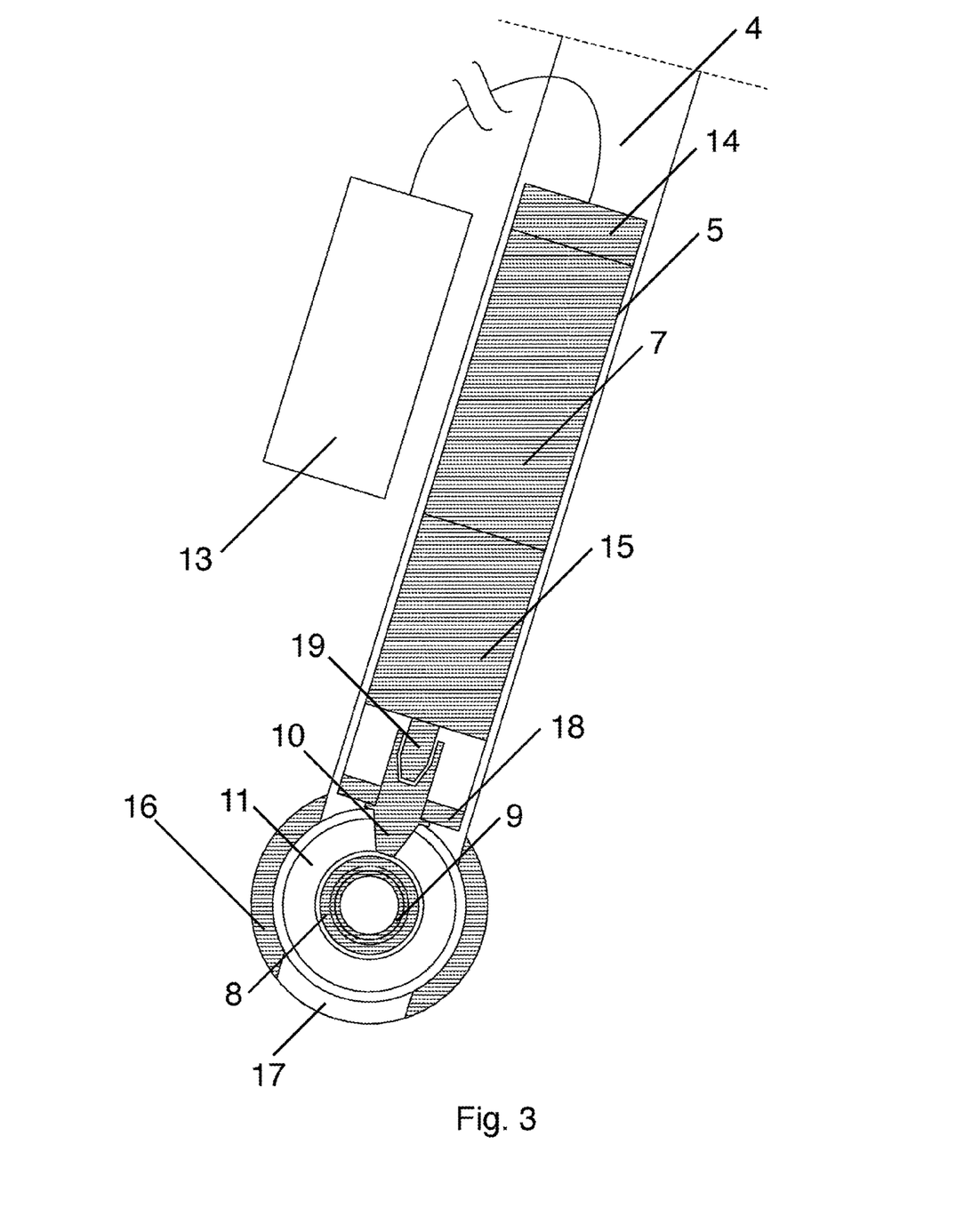
FIG. 3 shows a longitudinal cross-section of the single engine motor power unit.
Figure 4:
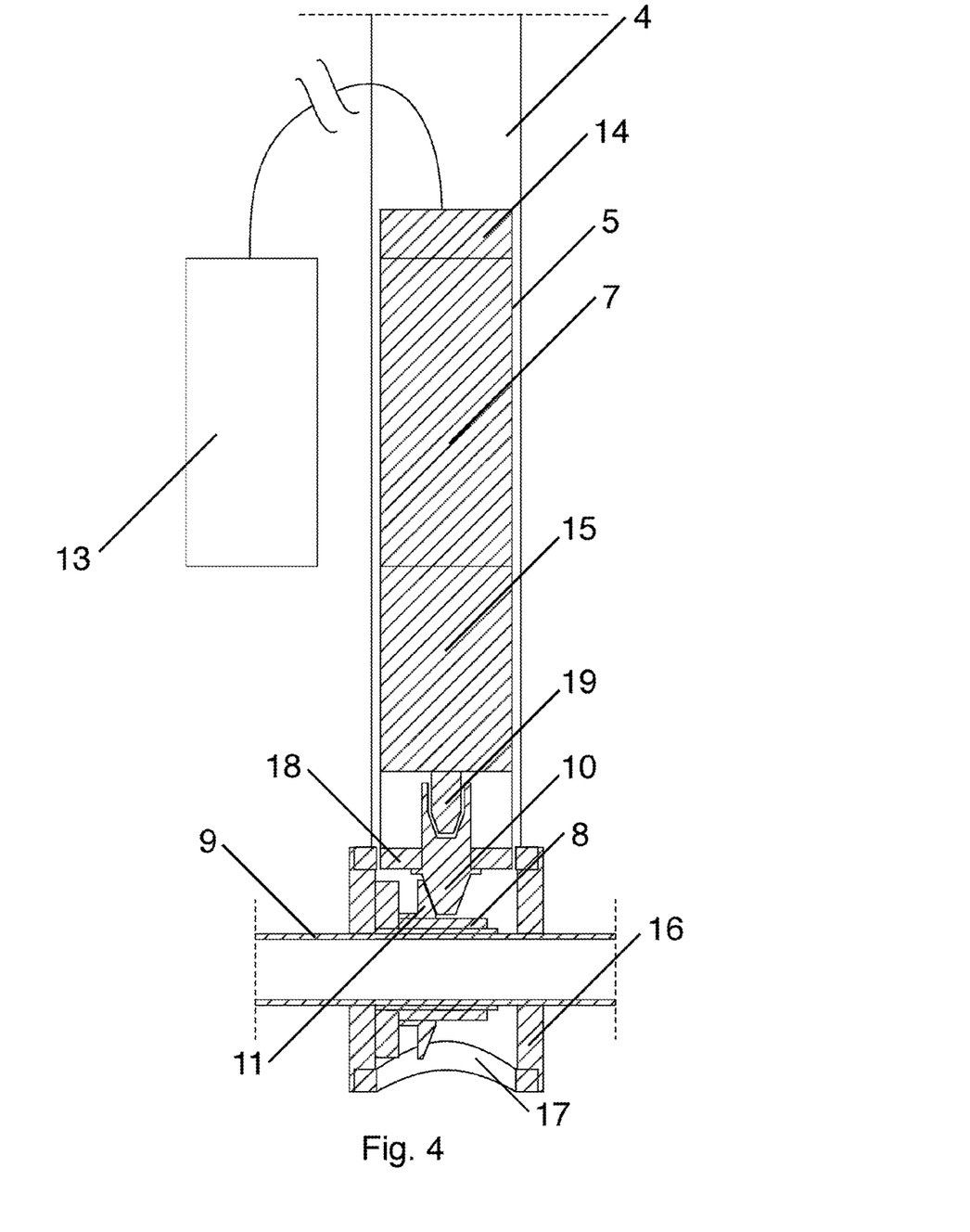
FIG. 4 shows another longitudinal cross-section of the single engine motor power unit.

FIG. 3 shows a cross-section of the crank shaft 9, and FIG. 4 shows a longitudinal cross-section of the crank shaft 9, where the single motor power unit 5 is placed into the seat tube 4. The operation of the single motor power unit 5 is presented on FIGS. 3 and 4 thoroughly. The design and size of the single motor power unit 5 makes it fit for being installed into the seat tube 4 or another frame tube of any bicycle without being visible and without any significant change to the bicycle frame. Installation is carried out through the mounting hole 17 of the bottom bracket 16 of the seat tube 4. The parts of the single motor power unit 5 include the motor 7, the respective motor controller 14, and the power supply 13 providing power. The operation of the motor is dependent on the capacity of the power supply 13, which may be a battery, for example. The battery may be mounted onto the bicycle or in the frame as needed. The cogwheels, the crank shaft pinion gearhead 11 and the propulsor pinion gearhead 10 play primary role in driving. The crank shaft pinion gearhead 11 is connected to the crank shaft 9 through bearings 8. The propulsor pinion gearhead 10 is driving the crank shaft pinion gearhead 11 through the motor 7 and the planetary gearbox 15. A novelty of the device, the pinion with dynamometric system 19 that is the primary safety provider is located between the planetary gearbox 15 and the propulsor pinion gearhead 10. The axis of the pinion with dynamometric system 19 and of the propulsor pinion gearhead 10 is the same, as secured by the fixing bearings 18.

Figure 5:
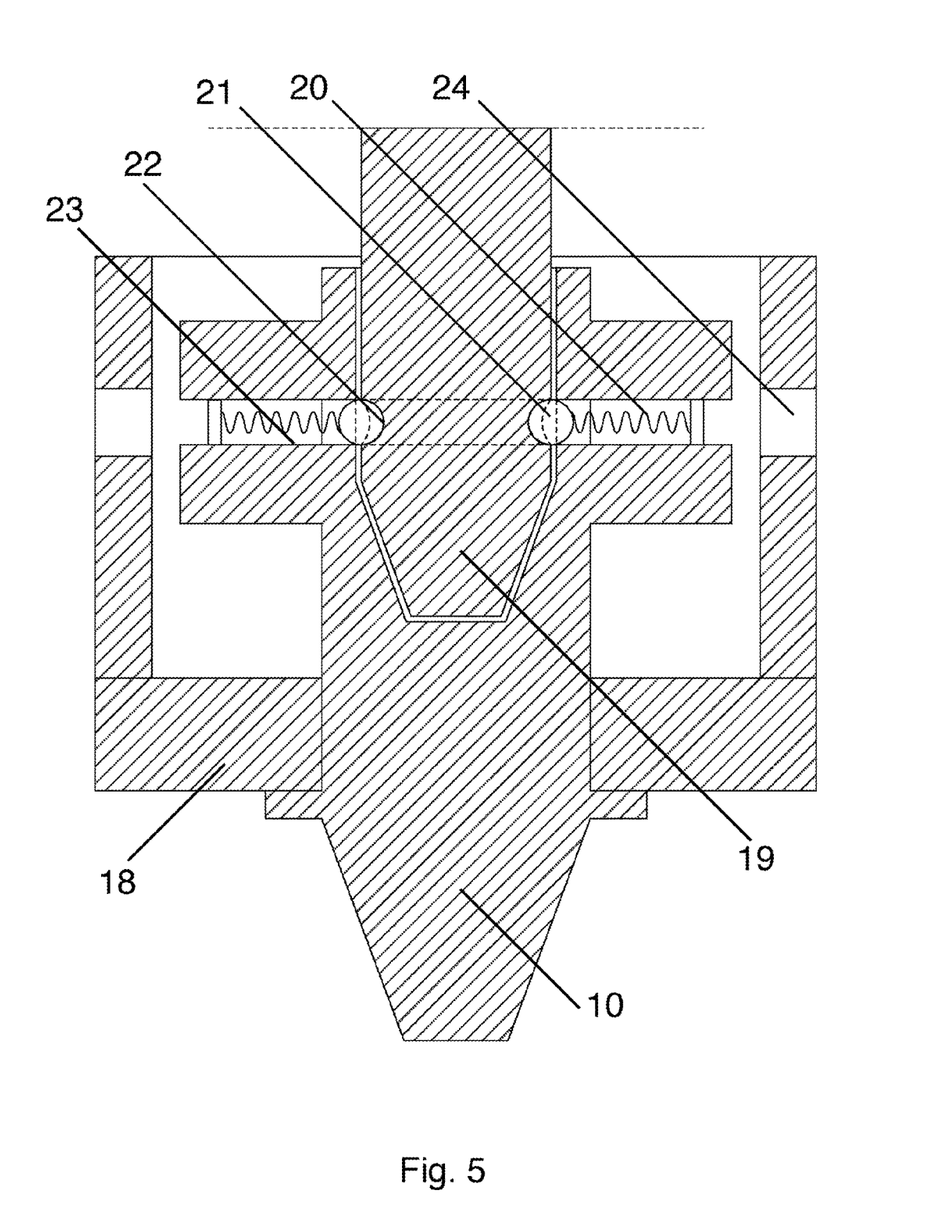
FIG. 5 shows the longitudinal cross-section of the pinion with dynamometric system.

FIG. 5 shows the pinion with dynamometric system 19 in more detail. The pinion with dynamometric system 19 is connected to the propulsor pinion gearhead 10 through ball bearings 21. The pinion with dynamometric system 19 and the propulsor pinion gearhead 10 have the same axis, this is ensured by fixing bearings 18. The pinion with dynamometric system 19 can be driven in both directions, which makes the operation of the motor unit absolutely silent and quiet. When driving backward unexpectedly, the pinion with dynamometric system 19 prevents any damage to the propulsor pinion gearhead 10. The interruption of driving the bicycle by human force results in great and unexpected momentum on the device, which may cause damage to the propulsor pinion gearhead 10. The pinion with dynamometric system 19 protects the propulsor pinion gearhead 10 against the harmful impact of the momentum like a torque wrench. A round canal 22 and volutions 23 are implemented in the pinion with dynamometric system 19, so that ball bearings 21 are located in the volutions 23 in the round canal 22, pressed down by a spring 20. The route of the spring 20 can be regulated and adjusted through the mounting hole 24. If any strike or load reaches the pre-set value, the ball bearing 21 pressed down by the spring 20 can move in the round canal 22 to the next volution 23, thereby reducing the pressure on the pinion with dynamometric system 19.

The presented devices have numerous advantages. The power unit is an invention that can be used for riding bicycles and can be built into a bicycle frame. The power unit can be used to supplement bicycles used for hobby and tourism related purposes in order to make uphill riding less exhausting and to facilitate longer trips. Another important advantage of the invention is that the user makes use of the support when it is actually needed, instead of using it all the time, as in the case of inventions belonging to the state of the art. Another advantage of the solution is that it is absolutely undetectable from the outside, meaning that it is quiet and can be transported easily due to its small weight. It can be fitted into a car or placed on a roof rack easily. Another important advantage is that the bicycle will remain easy to manoeuvre due to the support provided to the pedal axis. Another advantage of the invention is that the motor does not keep rotating the axis when it is not driven by human force, due to the installed pinion with dynamometric system. This also makes the support undetectable. The device also keeps the motor free from damage in case of an accident, when the crank shaft stops unexpectedly due to any hindrance to the pedals. This also protects the crank shaft from breaking under the powerful force. The system that can also be driven backward makes the operation of the device even more silent. This is achieved so that the pinion with dynamometric system prevents the propulsor pinion gearhead from damages when driving backward unexpectedly. The interruption of driving the bicycle by human force results in great and unexpected momentum on the device, which may cause damage to the gearheads. The pinion with dynamometric system protects the gearheads against the harmful impact of the momentum, like a torque wrench. A round canal and volutions are implemented in the pinion with dynamometric system, so that ball bearings are located in each round canal, pressed down by a spring. If any strike or load reaches the pre-set value, the ball bearing pressed down by the spring can move in the round canal to the next volution, thereby reducing the pressure on the pinion with dynamometric system. Due to its geometry, the single motor power unit can be driven backward and, when switched off, the bicycle can be driven by foot without friction or rotation by the cogwheels, thereby making the power unit undetectable. If the user starts driving the pedals backward unexpectedly, the pinion with dynamometric system prevents any damage to the propulsor pinion gearhead. After installing the device according to the invention, the weight of the bicycle may be kept below 8 kg. Due to the low position of the centre of gravity, the user does not even notice that he is riding a bicycle with electric support. When the support is not turned on, the bicycle is a normal bicycle just like any other bicycle. Fitting the power unit according to the invention enables tired, less trained, or even older or ill people to do sports activities under more difficult circumstances and to complete longer distances and uphill rides. The invention enables efficient movement with a bicycle without any lactic acid being produced in the muscles, without the heart rate going to high, so that human power and the momentum of the power unit, as well as the ratio of these two factors can be regulated, thereby enabling the rehabilitation of injured people. This provides the users with an excellent opportunity, as the user of a bicycle fitted with such a device can travel to places and can ride longer distances by combining his own power and the assistance of the power unit, without losing the fun of doing sports, that cannot be matched by using other bicycles, rollers, or similar items that are not equipped with the power unit according to the invention. It is also advantageous that the bicycles can be personalized. For example, it can be set when the power unit should switch on and from what time the motor should provide assistance. The central processor unit of the device can be a simple button, a knob, a mileage meter, a mobile phone, a rotation meter, or even a heart rate meter. For example, it can be set that the motor turns on when the heart rate is high and keeps providing assistance until the heart rate drops below a desired threshold. It is a very important advantage that the power unit according to the description can be fitted into any bicycle frame, due to the design of the house of the unit. This advantage—i.e. that no changes to the bicycle frame are required as the invention can be fitted into almost any existing bicycle frame—is also ensured by the fact that the power unit can be fitted into a vertical seat tube or a tilted frame tube. Thus, the power unit increases the performance/weight ratio of the bicycle and biker while the power unit remains undetectable and silent and the weight of the bicycle is increased by 1.5 kg only, without any impairment to traditional usability and appearance of the bicycle. It is also an important advantage that the power source for the unit can be placed anywhere on the bicycle or the user, even in the flask or inside the bicycle frame if discretion is necessary. The power source can be a battery or any other unit that produces and/or stores electricity that is suitable for the purpose. The capacity of the power source can be personalized, and batteries with larger capacity can run the motor for longer periods. The novelty and an important advantage of the solution is that no resistance is provided and the cogwheels and the motor is protected against damage and wear when no support is provided, due to the bearing that runs freely on the crank shaft.

In addition to the above examples, the invention can be implemented in other forms and with other manufacturing procedures within the scope of protection.

The invention claimed is:

1. A single motor power unit, suitable for being mounted onto a bicycle frame, comprising:
   a motor (7),
   a power supply (13),
   a bearing (8),
   a crank shaft pinion gearhead (11),
   a propulsor pinion gearhead (10),
   a planetary gearbox (15), and
   a central processor unit (12);
   wherein the motor (7) is electrically connected to the power supply (13);
   wherein the crank shaft pinion gearhead (11) is connected to a crank shaft (9) through bearings (8);

wherein the central processor unit (12) is wired or wireless connection with the motor (7);

wherein the propulsor pinion gearhead (10) is connected to a pinion with a dynamometric system (19) having an identical axis with the propulsor pinion gearhear (10), and to the planetary gearbox (15) therethrough such that the pinion with the dynamometric system (19) is located between the planetary gearbox (15) and the propulsor pinion head (10);

wherein an inside of the bearing (8) is in fixed connection with the crank shaft (9) and an outside of the bearing (8) is in fixed connection with the crank shaft pinion gearhead (11);

wherein the crank shaft pinion gearhead (11) is connected to and driven by the propulsor pinion gearhead (10) through the motor (7) and the planetary gearbox (15);

wherein the pinion with dynamometric system (19) comprises: a spring (20), a ball bearing (21), a round canal (22), and a volution (23);

wherein the pinion with dynamometric system (19) is connected to the propulsor pinion gearhead (10) through the ball bearing (21);

wherein the pinion with dynamometric system (19) and the propulsor pinion gearhead (10) are secured by fixing bearings (18);

wherein the ball bearing (21) is located in the volution (23) in the round canal (22), and is pressed down by the spring (20); and wherein the pinion with dynamometric system (19) is configured to accept driving forces from both rotational directions and to prevent damage to the propulsor pinion gearhead (10) resulting from harmful impact of momentum.

2. The unit according to claim 1, wherein the power supply (13) is located externally to the bicycle frame.

3. A bicycle comprising the unit of claim 1, wherein the bicycle frame including at least one seat tube (4); and the single motor power unit mounted and concealed within the at least one seat tube (4).

4. A bicycle comprising the unit of claim 1, wherein the bicycle frame at least one frame tube (3); and the single motor power unit mounted and concealed within the at least one frame tube (3).

* * * * *